United States Patent [19]
Thomas

[11] Patent Number: 5,637,854
[45] Date of Patent: Jun. 10, 1997

[54] OPTICAL BAR CODE SCANNER HAVING OBJECT DETECTION

[75] Inventor: James E. Thomas, Issaquah, Wash.

[73] Assignee: Microscan Systems Incorporated, Wash.

[21] Appl. No.: 532,105

[22] Filed: Sep. 22, 1995

[51] Int. Cl.[6] .................................................. G06K 7/10
[52] U.S. Cl. ........................................ 235/462; 235/454
[58] Field of Search ............................... 235/462, 472, 235/454

[56] References Cited

U.S. PATENT DOCUMENTS

| | | |
|---|---|---|
| 4,136,779 | 1/1979 | Bieringer . |
| 4,339,745 | 7/1982 | Barber et al. ............... 235/454 |
| 4,639,606 | 1/1987 | Boles et al. . |
| 4,644,151 | 2/1987 | Juvinall ..................... 235/494 |
| 4,855,909 | 8/1989 | Vincent et al. ............. 235/375 |
| 4,933,538 | 6/1990 | Heiman et al. . |
| 5,028,769 | 7/1991 | Claypool et al. ............ 235/462 |
| 5,177,346 | 1/1993 | Chisholm ................... 235/462 |
| 5,237,161 | 8/1993 | Grodevant .................. 235/462 |
| 5,239,169 | 8/1993 | Thomas . |
| 5,260,556 | 11/1993 | Lake et al. .................. 235/494 |
| 5,280,162 | 1/1994 | Marwin ...................... 235/462 |
| 5,424,525 | 6/1995 | Rockstein et al. . |
| 5,449,891 | 9/1995 | Giebel ........................ 235/462 |

FOREIGN PATENT DOCUMENTS 0424097  10/1990  European Pat. Off. .............. 235/462

OTHER PUBLICATIONS

"Leading the Way in Fixed-Mount Bar Code Scanning", Microscan Systems Incorporated company brochure, 1990.

*Primary Examiner*—Donald T. Hajec
*Assistant Examiner*—Mark Tremblay
*Attorney, Agent, or Firm*—Graybeal Jackson Haley LLP

[57] ABSTRACT

In a bar code scanner of the fixed amount type, laser beam reflections from the target location are collected by an object detector that senses predetermined specular reflections and determines whether an object is present or absent, and whether the object has a bar code label or lacks a bar code label.

18 Claims, 8 Drawing Sheets

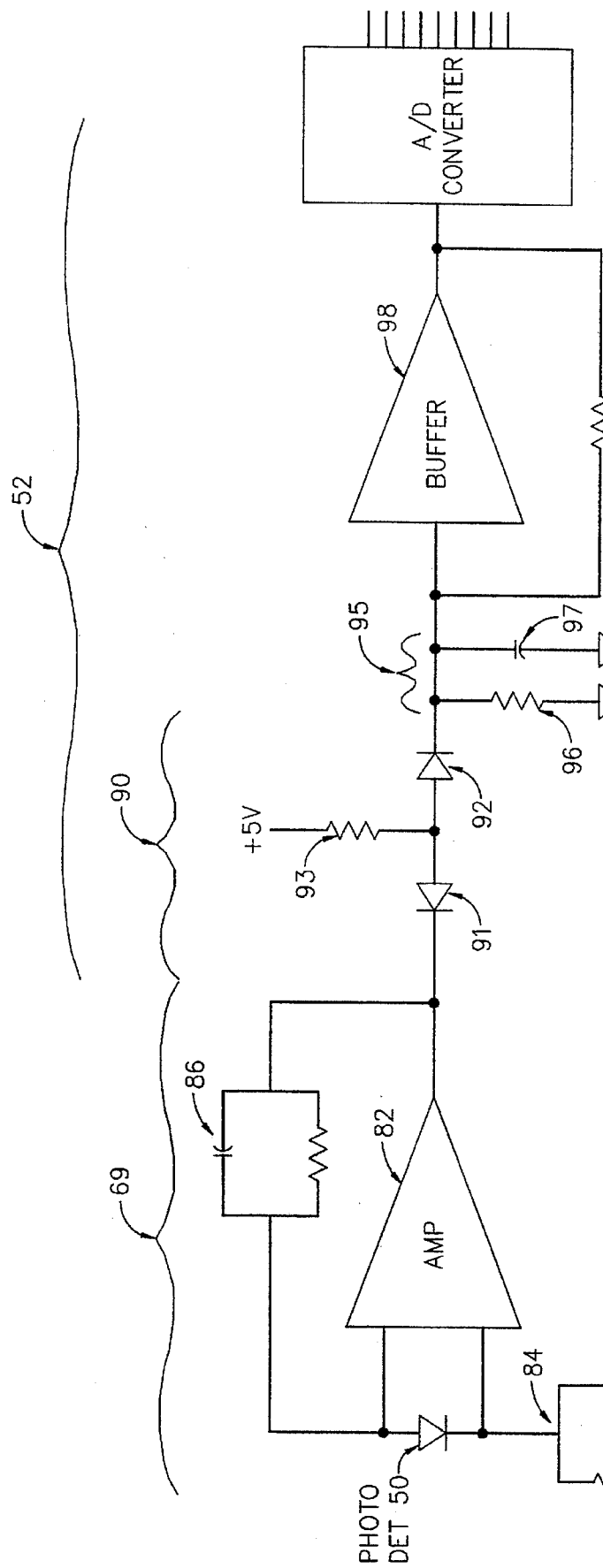
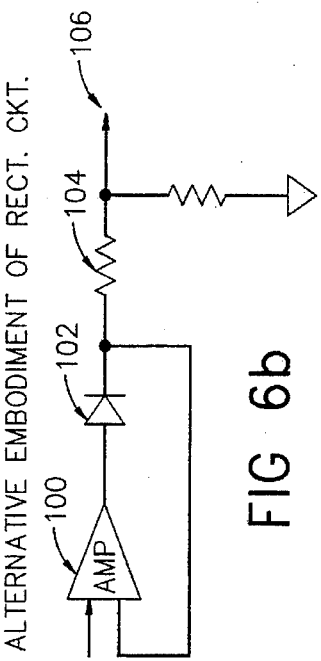
FIG 6a
FIG 6b
ALTERNATIVE EMBODIMENT OF RECT. CKT.

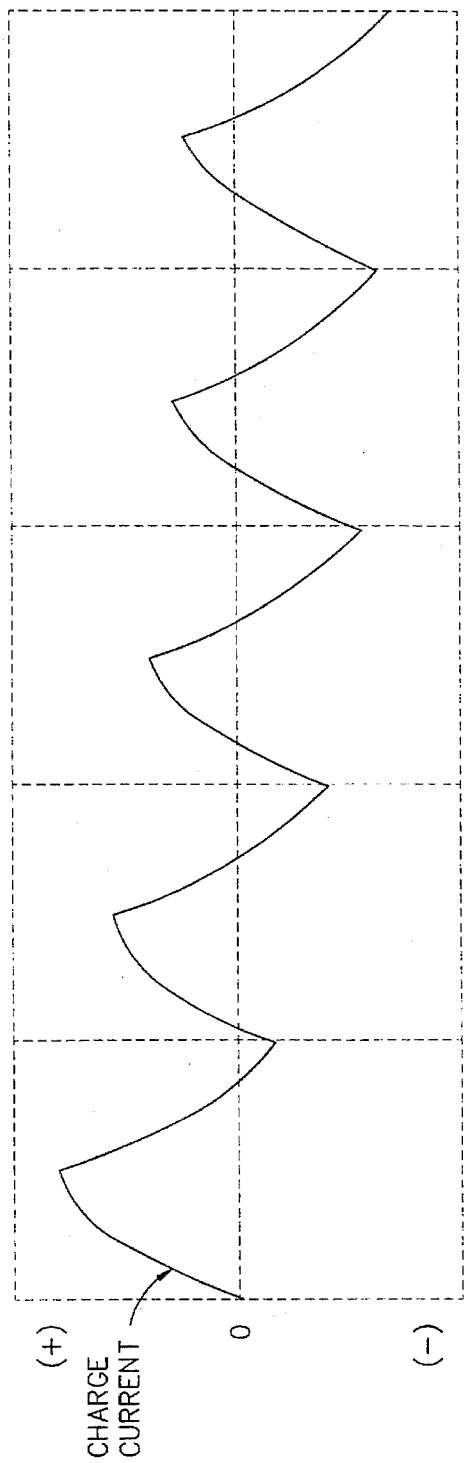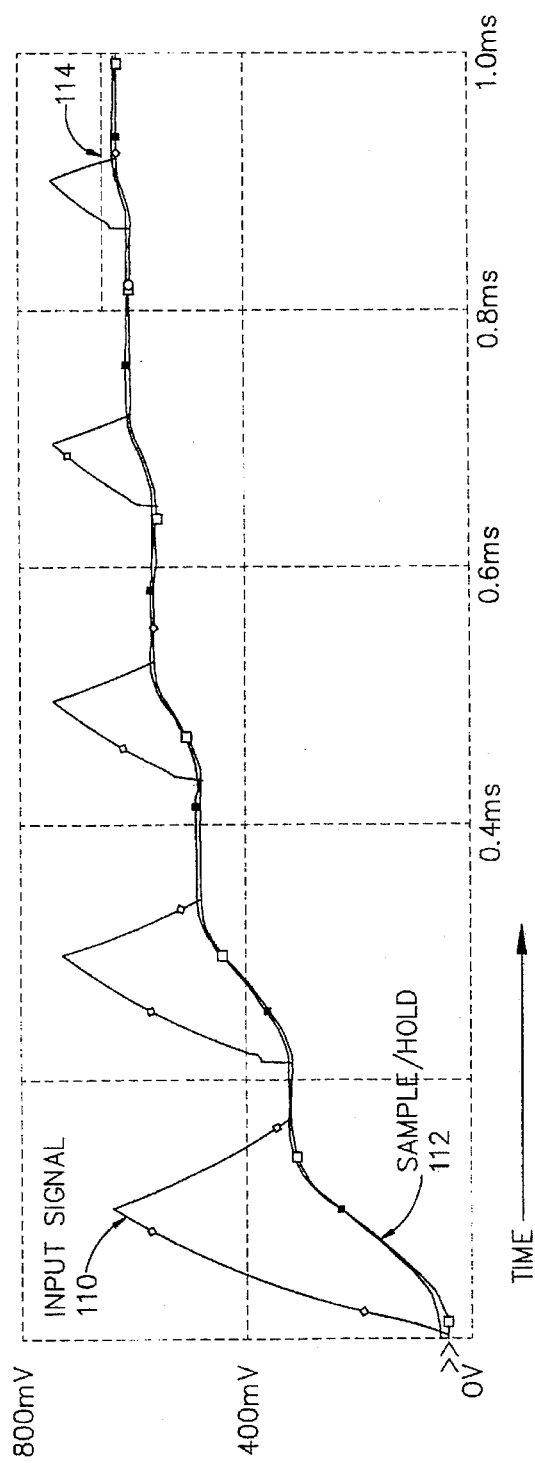

(SCAN 204 ROUTINE)

OPTICAL BAR CODE SCANNER HAVING OBJECT DETECTION

BACKGROUND OF THE INVENTION

The present invention relates to optical bar code readers and includes an optical signal processor for both detecting and reading bar code labels on objects and detecting the presence or absence of the objects themselves.

Fixed scan bar code readers are often used in such environments as production plants and scientific research laboratories to automatically take an inventory of items transported by automatic conveyance passed a fixed optical scanner. For example, in laboratory studies, pharmaceutical testing and production plants it is often necessary to make a careful inventory of each compound held in a vessel such as a test tube where hundreds of such compositions and their containers are handled by automated or semi-automated equipment. A bar code label on each vessel such as a test tube has been found to be a reliable and highly efficient expedient to maintain the necessary inventory control over the compounds. The fixed scanners are placed alongside a line array of vessels that are transported across the path of the fixed optical scanner. The bar codes, when presented to the scanner, are read automatically and the resulting label information is fed to data processing equipment for identifying that particular vessel, its compound, and other pertinent data.

In such an environment, to maintain the high integrity of production and scientific control, it is desirable to know when a particular object is present or absent at each retention location. For example, the automated equipment may transport a single file line-up of test tubes past the scanner. A transportable rack is provided with test tube holders. When any of these holders, which may simply be a receiving hole in a rack, is empty, that information is useful in order to take an accurate inventory of the vessels present and their respective bar codes.

Therefore, it is an aspect of the present invention to incorporate, in a bar code scanning and reading system, a device for sensing the presence or absence of the object itself, especially objects having a reflectivity that is significantly different compared to that of the bar code label, such as transparent or translucent glass, ceramic, plastic, or other similar materials. In some existing systems, efforts have been proposed to determine whether an object is present or absent from the processing of the bar code label data. For example, using known bar code verification techniques including code matching algorithms, it is possible to verify that a valid label has been read and in such case it is presumed that the object is present. If only fragments of bar code data are detected, the signal processing presumes that a label or part of a label was present, even though unreadable or unverifiable, and that therefore the object is also present. As the retrieved bar code fragments diminish below a certain threshold level it is assumed that no label is present and in such case it is unknown or at least uncertain as to whether the object is present. When the presence or absence of the object, such as a test tube, is unknown or at least uncertain, the ability of the system to provide accurate inventory and quality control is diminished.

SUMMARY OF THE INVENTION

In accordance with an aspect of the present invention, a bar code scanner is provided for reading bar code labels on objects by causing a beam of coherent light, such as from a diode laser, to scan across target locations that are adapted to hold objects labeled with bar codes. Reflections from the bar code label are photo detected and the relative reflectivity from the bar code on the label is converted into a fluctuating reflectivity signal that is processed to yield the information encoded in the object's bar code. Reflections from the target location are also collected by an object detection processor that senses a predetermined specular content of the reflections and determines whether an object itself is present even though the object lacks a label or lacks a bar code on the label. In the case of transparent objects, especially glass or plastic test tubes or other vessels that have a polished smooth but contoured surface, reflection at right angles off of the contoured transparent object surface will produce a strong specular return in the object presence photo detector. The presence or absence of such bright distinctive specular reflection off of the transparent object surface provide a reliable indication of the presence or absence of this object even when no label is present.

In a preferred embodiment of the invention, the same scanning beam used to detect and read the bar code label is employed to cause the reflections off of the surface of the object to detect its presence or absence. Furthermore, in the preferred embodiment, the detection of the presence, or absence of the object is performed by looking for the distinctive reflections when they are within the same plane as the scanning beam, hence at right angle to the object surface at the point of scan beam incidence. Since non-coherent, e.g., yellow light, results in reflections off an object surface that fall off in intensity as the cosine of distance, reflection of coherent, specular light from the object surface, when normal to the source beam, do not fall off as rapidly with distance, and hence the specular reflection from the coherent scanning beam stand out against the noise background of yellow light ensuring reliable object presence or absence detection. Also in the preferred embodiment, the scanning beam is produced by a rotating multi-faceted mirror that causes a source beam from a coherent laser diode to scan in a fan-shaped pattern of about 60° in a vertical plane intercepting lengthwise axis of each test tube. The tubes are sequentially conveyed past the scanner in a side by side upstanding array in a test tube rack or other conveyable holder. The bar code label is placed on each test tube so that the alternating high and low reflectivity bars are transverse to the test tube axis. The fan-shaped scanning beam thus defines a scanning plane that intersects the lengthwise axis of each test tube forming a scan line on the vertically oriented label. Reflections from the test tube and label are directed back into that same plane when each test tube body is conveyed into dead center alignment registration with the scanning beam. It is at this registration position that the reflections from the object surface such as a bare glass test tube are directed back to the object photo detector of the scanner. A limited angle acceptance window on the object photodetector and filtering of the resulting signal from the object reflections further ensure reliable object presence or absence detection.

BRIEF DESCRIPTION OF THE DRAWINGS

The foregoing and other features of the present invention will be more fully appreciated when considered in light of the following specification and drawings in which:

FIG. 4b is a plot of signal levels associated with the operation of the object detection illustrated by FIG. 4a.

FIG. 6a is a detailed schematic diagram of the object detector filter and rectifier circuit, and FIG. 6b is an alternative rectifier circuit embodiment of the detector signal processor of FIG. 5.

FIG. 7a and 7b are signal level plots showing the signal processing operations of the detection circuit of FIG. 6a.

DETAILED DESCRIPTION

Figure 1:
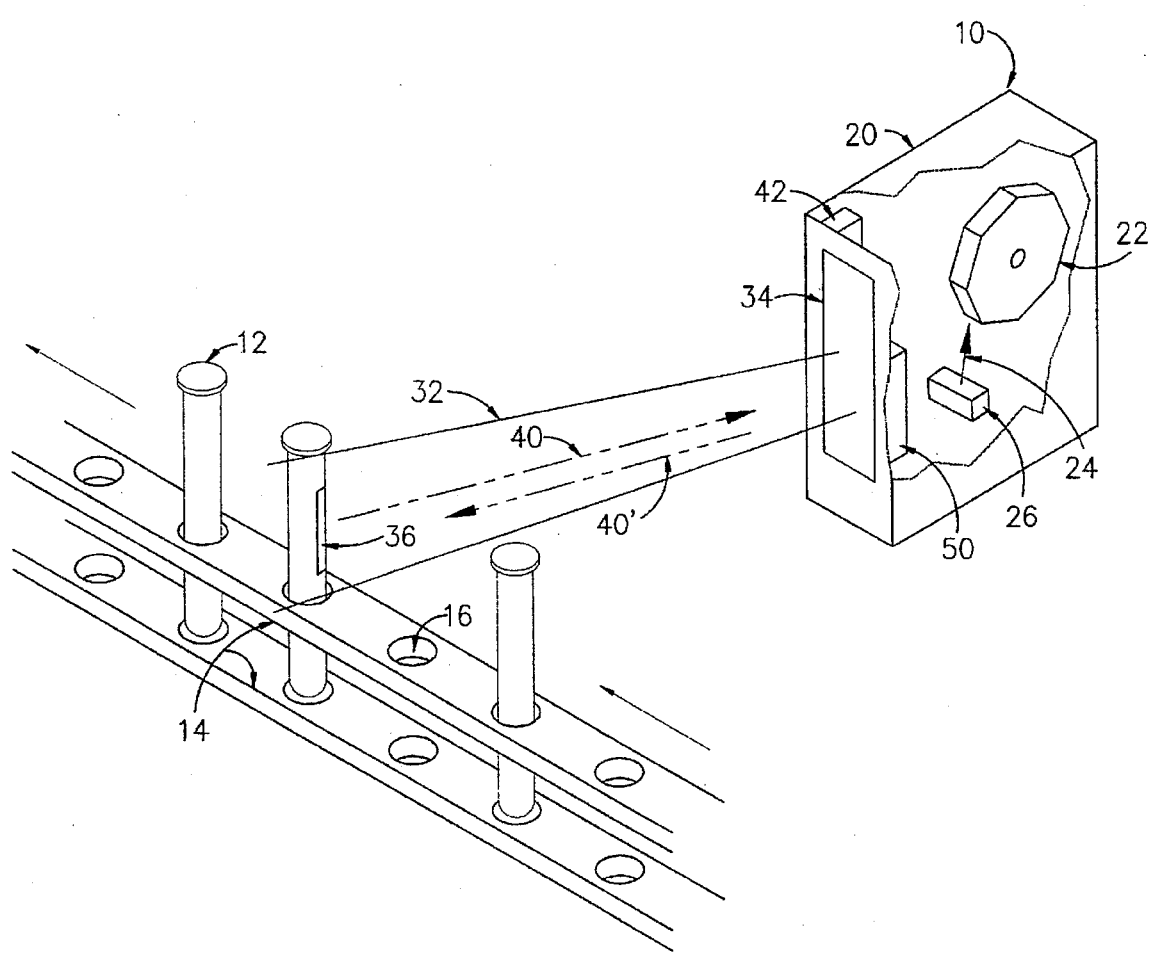
FIG. 1 is an isometric pictorial view of the preferred embodiment of the invention showing the bar code scanner and object detector unit positioned to read bar code labels and detect the presence or absence of chemical vessels such as test tubes conveyed in a holder past the scanner.
Figure 2:
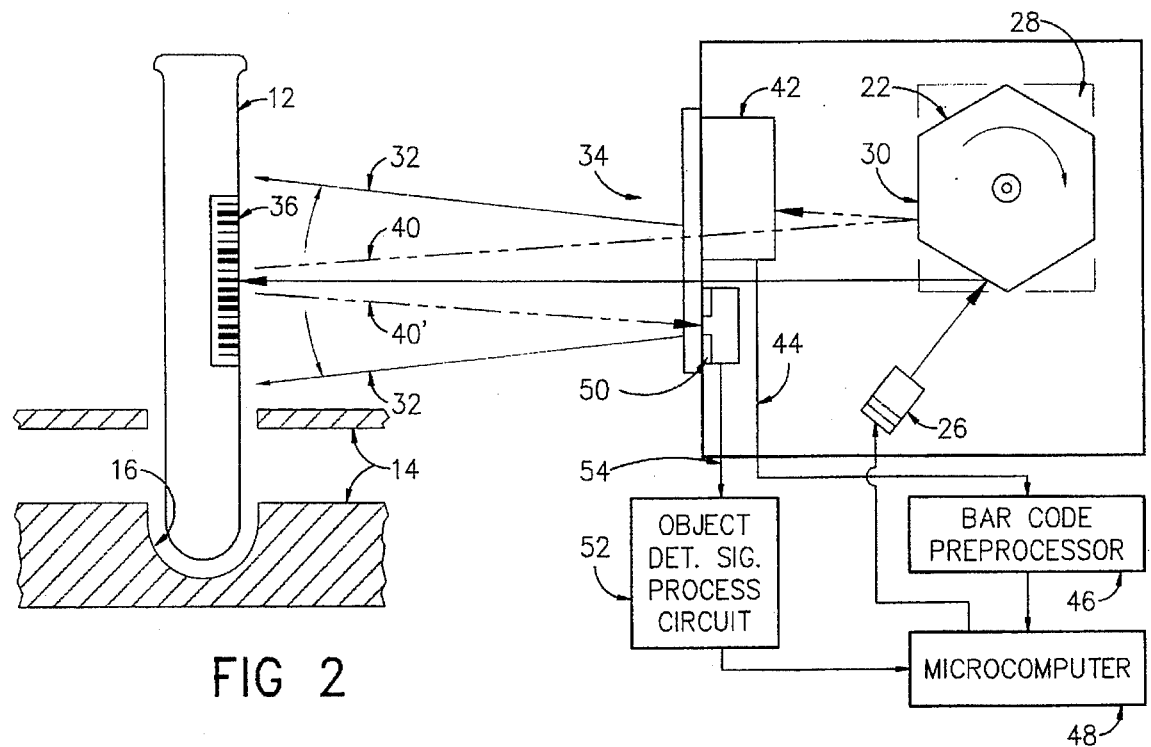
FIG. 2 is a side elevation view and block diagram of the scanner, including the object detector, and a bar code labeled test tube.
Figure 3:
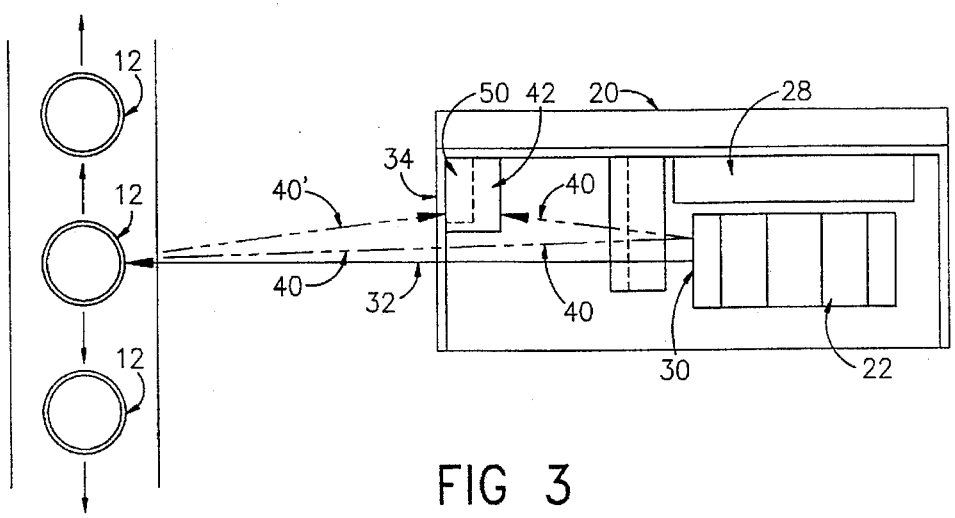
FIG. 3 is a top plan view of the scanner, including the object detector, and a plurality of test tubes as transported past the fixed mount scanner station.

FIG. 1 shows the invention in its preferred embodiment in which a bar code scanner 10 of the fixed mount type includes object detection and is mounted alongside a rack conveyance or the like for moving a plurality of objects, in this case, test tubes 12 past the scanner. Test tubes 12 may be held by any suitable means such as a rack 14 shown here that is formed with a plurality of test tube receiving openings 16. Bar code scanner 10 includes a housing 20 in which a multifaceted rotating scanner mirror 22 intercepts a beam 24 of coherent light produced by a laser diode 26. Mirror 22 is rotated by a motor 28 (see FIG. 3) so that each of multiple of facets 30 (see FIG. 2) reflect beam 24 in a fan-shaped scan 32, here in a vertical plane aligned with the elongate axis of the test tube 12. Fan-shaped scan 32 passes through a window 34 of scanner housing 20 as illustrated in FIGS. 1, 2 and 3, so that as each test tube is transported across the path of the scan 32 light is reflected off of a bar code label 36 (see FIG. 2). The alternating high reflection background and low reflection black bars of the bar code label are spaced vertically, or in this case lengthwise along the test tube. The width of the code bars thus wraps partly around the tube's circumference. As the coherent beam of laser light is deflected into the fan shaped scan pattern 32 by the rotating mirror 30, the beam sweeps vertically forming a scan line lengthwise of the test tube body from a lower end of label 36 to an upper end. This scan orientation is called a "ladder" and is generally preferred because the beam makes multiple vertical sweeps or "climbs" of the label code as the object is transported horizontally past the fix scan station. Reflections off of the label indicated at 40 alternate between high and low intensity due to the alternating dark bars such as black ink print on light background, usually white paper label. The reflections 40 propagate back to scanner 20 and in this embodiment return generally along the beam scan axis 32 striking a facet 30 of mirror 22 that in turn reflects the returns into a receiving face of a bar code scan detector 42 that is oriented toward mirror 22. Detector 42 operates to collect the reflections off of the bar code label and develop a signal of fluctuating reflectivity level representing the bar code.

The resulting signal is fed over connection 44 to a bar code preprocessor 46 that shapes and conditions the signal and performs certain known preprocessing operations, such as described in U.S. Pat. No. 5,239,169. It is then fed as a preprocessed digital signal to a microcomputer 48 holding a stored program for reading the code and outputting or storing the contents of the label 36.

Figure 4A:
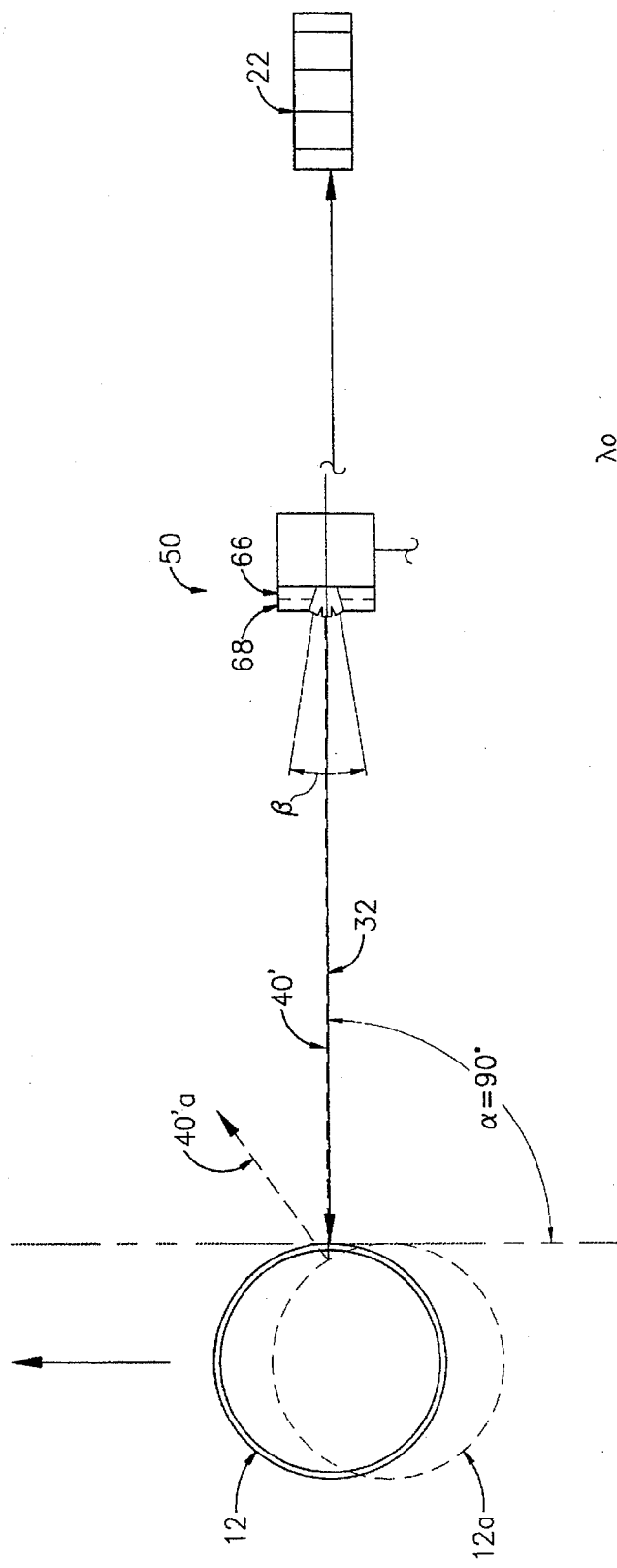
FIG. 4a is an enlarged diagrammatic illustration of the optical scan beam and specular reflection detection from the round, smooth surface test tube as seen from the top plan view of FIG. 3.
Figure 4B:
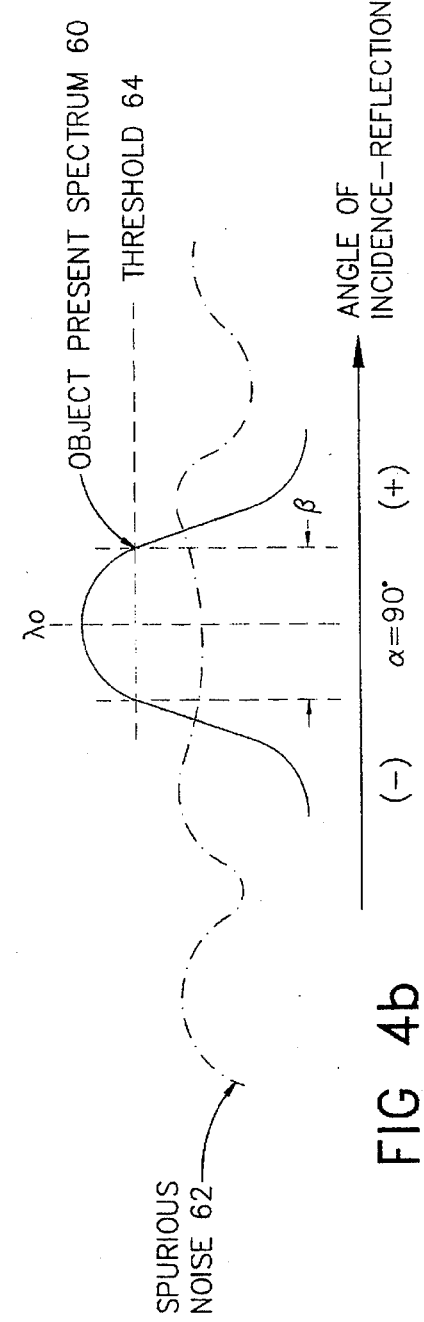

Incorporated into scanner 20 and operating in combination with the existing coherent scan beam 32 are object presence detection components including object reflection detector and filter assembly 50 and an object detection signal processing circuit 52 connected to detector assembly 50 over connection 54 as best shown in FIG. 2. It is a feature of the invention that detector assembly 50 is constructed and arranged on scanner 20 so as to receive specular reflections, if any, from each object such as test tube 12, when present at each of the object retaining locations. The reflections off the object are indicated at 40' and are unique in that specular reflections, that is reflections at the frequency of the coherent source light from laser diode 26, are produced off of a surface of the object that might otherwise absorb or transmit scan light, such as yellow or non-coherent light. It is a unique characteristic of smooth or polished surface objects such as bare transparent glass or plastic test tubes or other pharmaceutical containing vessels that a beam of coherent laser light such as the beam in bar code scan 32 when incident at a normal angle, that is 90° to the surface, returns specular reflections that are high energy relative to other types of light sources and other angles of incidence and reflection. This is best illustrated in FIGS. 4a and 4b which show in FIG. 4a a top view of the scanner object detector assembly 50 and one of the test tubes 12 transported passed the fixed scanner station. When the fan-shaped scan beam 32 that is used for reading a label strikes the circumferential surface of test tube 12 dead center of the diameter, then a reflection 40' in the same plane as the fan-shaped scan bean 32 is returned to detector assembly 50 as a distinctive, high intensity reflection as illustrated in FIG. 4b at the coherent source frequency $\lambda_0$. Contrast the sharp reflection 40' of the scan beam when it strikes test tube 12 dead center, that is when the plane of scan beam 32 is aligned with the center axis of a test tube 12, to the reflection that occurs when the test tube is either slightly ahead or beyond the dead center position as indicated by the position of test tube 12a, shown in dotted line form, causing an off dead center reflection 40'a that is scattered away from the capture angle $\alpha$ of object detector assembly 50. This is illustrated also in FIG. 4b in which the prominent object present spectrum 60 is maximum at $\alpha=90°$ to the tangent of the circumferential surface of test tube 12. Furthermore, ambient, or yellow light and random reflections off of nearby structures and substances including test tube holders, clips, chemicals, or other assorted objects that may be present as the test tubes pass the scanner station create lower level yellow light noise in the detector 50 indicated as spurious no object present noise 62 level in FIG. 4b. By establishing an electronic threshold shown graphically as level threshold 64 in FIG. 4b, detector assembly 50 and object detection processing circuit 52 effectively and reliably sense the higher level specular reflections off of an object surface such as a bare test tube 12 at dead center of the scanning position. This specular reflection is then used as a signal to indicate object present, or in the case of an absence of the signal, to signify no object present.

To further enhance the efficacy of the object detection, photo detector assembly 50 includes a predetection optical device such as a filter 66 that provides a limited angle of acceptance β that, for example, is ±3° in a plane orthogonal to the plane of beam 32 which in this case would be in a horizontal plane relative to the scanner. Assembly 50 further includes an optical filter 68 that selectively passes the specular wave lengths $\lambda_o$ of the scan beam from source diode 26. It is observed that the sensitivity of the system to specular reflections off of such materials as transparent glass or plastic is highly sensitive to the angle of incidence and reflection at least in one plane. In this case, the width of the fan-shaped scan beam 32 which is incident on the test tube 12 at various vertical locations corresponding to the height of the label means that the reflections from this beam at dead center of the test tube will be at 90° in one plane but vary somewhat above and below 90° in the horizontal plane due to the spread of the scan beam. It is an aspect of this preferred embodiment of the invention that it is only the reflections that are normal to the test tube object in one plane, in this instance, being the vertical plane that are critical and thus the angle of acceptance β need only be selective in the horizontal plane to discriminate against reflections such as 40'a that deviate away from the plane of the scan beam 32. This is illustrated also in the side elevation view of FIG. 2 which shows that the object specular reflection 40' off of the test tube 12 is not necessarily coincident with the scan beam 32 in all of the orientations of its sweep. However, the specular reflection 40' off of the dead center position of the object 12 will lie within the same vertical plane as the sweep of beam 32.

Figure 5:
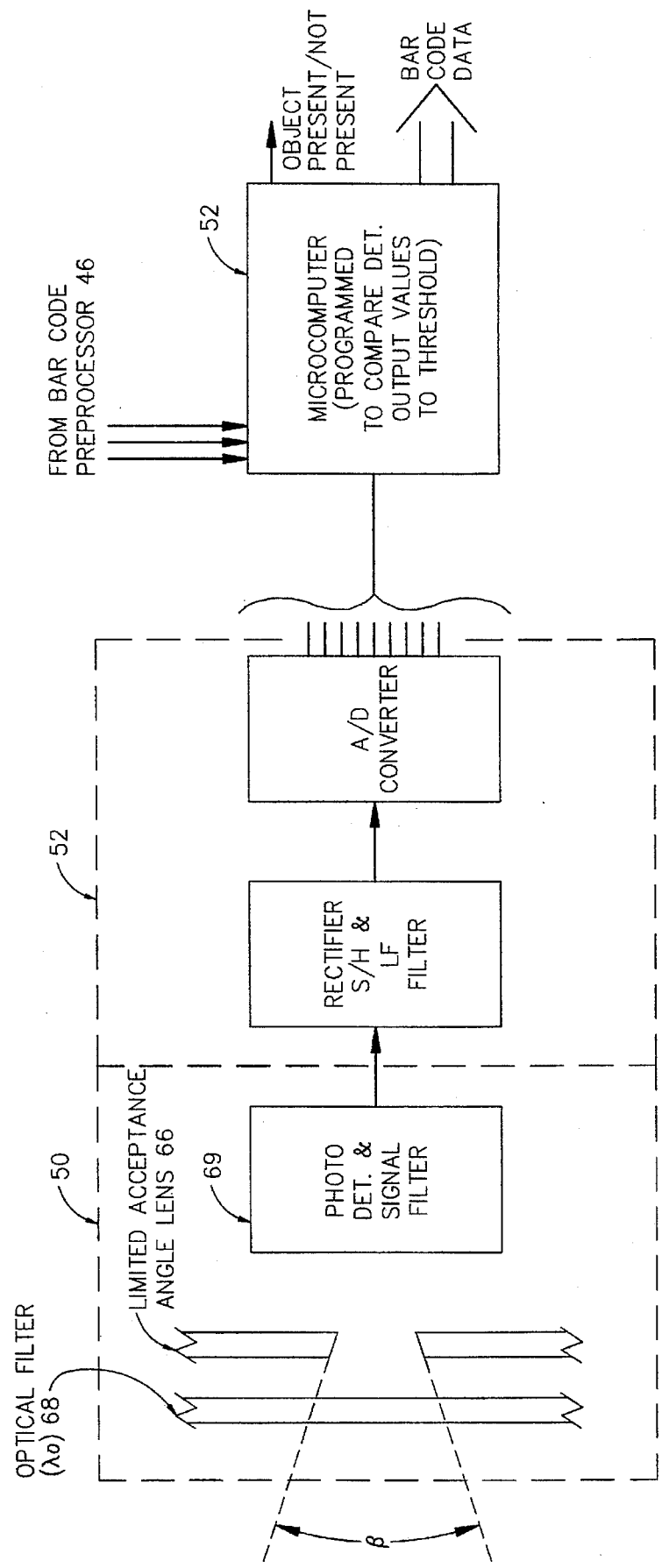
FIG. 5 is a block diagram of the object detector signal processor circuit shown in FIG. 2.

With reference to FIG. 5, a block diagram view illustrates the basic operating blocks of the object detection system. Thus, assembly 50 receives reflected light from an object, if any, filters it in optical filter 68 to selectively enhance the specular frequencies at $\lambda_o$. This operation further accentuates the wanted reflections that are within the optical acceptance angle β by limited view acceptance lens 66. Thereafter the resulting specular light energy is impingent on a photo detector and signal filter 69. The output from photo detector and signal filter 69 is passed on to a rectifier, sample and hold and low frequency A to D converter circuit that forms the object detection processing circuit 52. The digital output therefrom is fed to a microcomputer 48 which performs stored programmed operations on the digital signal to determine the presence or absence of the object, in coordination with the bar code detection and reading operations when the object is present with a bar code label.

In FIG. 6a, the photo detector and signal filter 69 is shown to include a solid state photo detector 80 connected across the input of an operational amplifier 82 and input and feedback high frequency RC filter networks 84 and 86, respectively, to filter out unwanted frequencies above the scan frequency representing object reflections 40'. An output of photo detector and signal filter 69 is applied to a diode rectification circuit 90 shown in the embodiment FIG. 6a as back-to-back diodes 91 and 92 connected to a supply voltage through resistor 93. An output of the rectifier circuit 90 is applied across a parallel resistive capacitive sample and hold circuit 95 here formed by resistor 96 and capacitor 97. An output buffer 98 transforms the output signal to a level and polarity suitable for analog to digital conversion by an A to D convertor shown generally at 52 in FIG. 5, which in turn is applied to a digital data bus of microcomputer 48 as also indicated in FIG. 5.

In certain applications involving low reflectance objects located at a distance from scanner 20, the alternative rectifier circuit of FIG. 6b is preferred to avoid an unwanted leakage current offset in the rectifier circuit 90 that may occur in the embodiment shown in FIG. 6a. Thus in FIG. 6b, an operational amplifier 100 receives at an input the signal from photo detector and signal filter 69 which is rectified by a diode rectifier 100 connected in feedback around operational amplifier 100 and applied to a voltage divider resistance network 104 that develops an output voltage at terminal 106 that in turn is applied to the sample and hold circuit 95 of FIG. 6a. Lower reflectance objects and objects at a distance are more readily detected by the alternative rectifier circuit of FIG. 6b, but at the expense of causing the full peak signal level of a single reflection pulse to be passed onto the sample and hold circuit, whereas the rectifier circuit 90 of FIG. 6a has a linear charge time constant that attenuates the peak value of the individual reflection pulses detected at detector and filter 69.

Figure 8A:
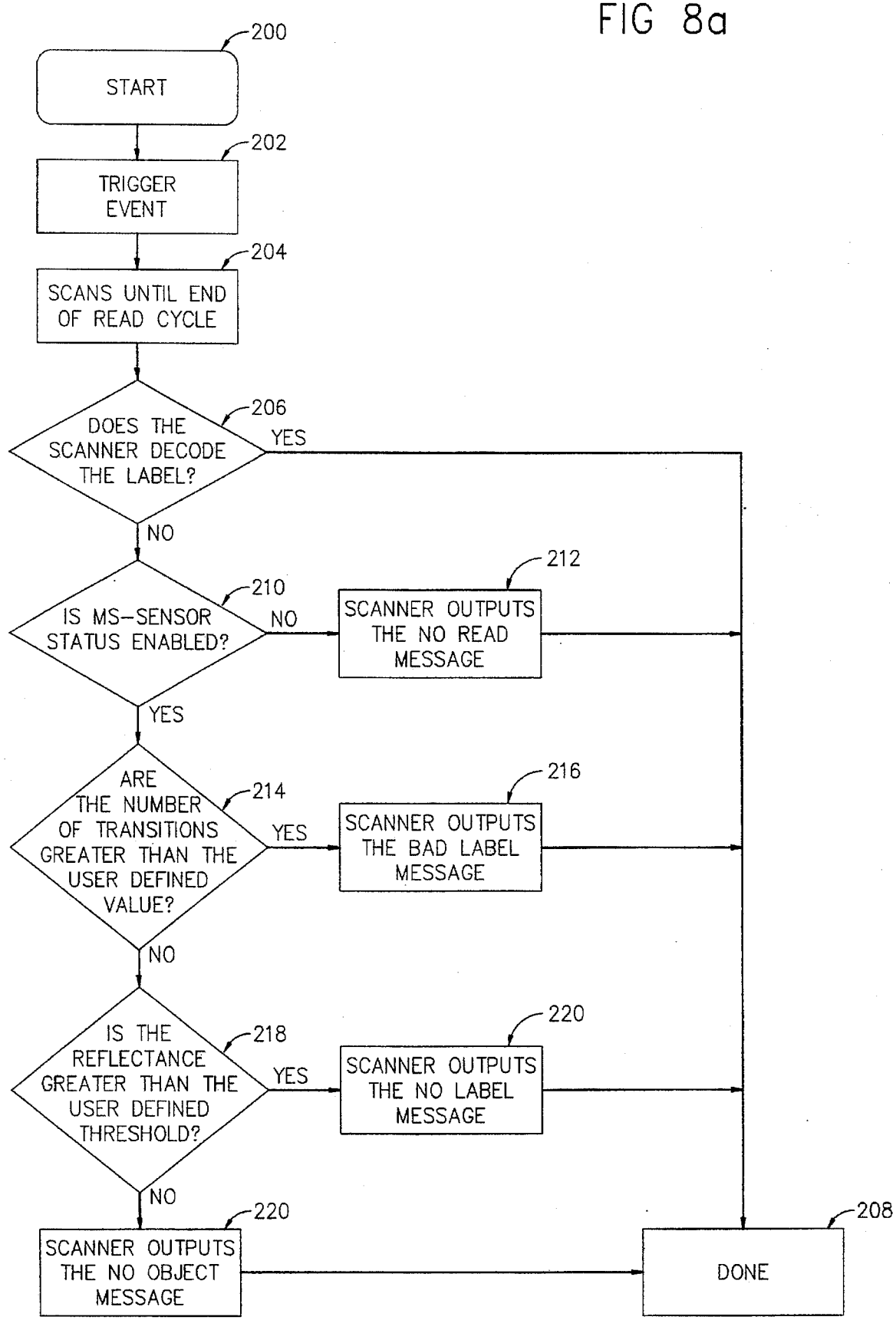
FIG. 8a is a flow diagram of the software processing of the bar code and object detection functions of the embodiment of FIGS. 1–3.
Figure 8B:
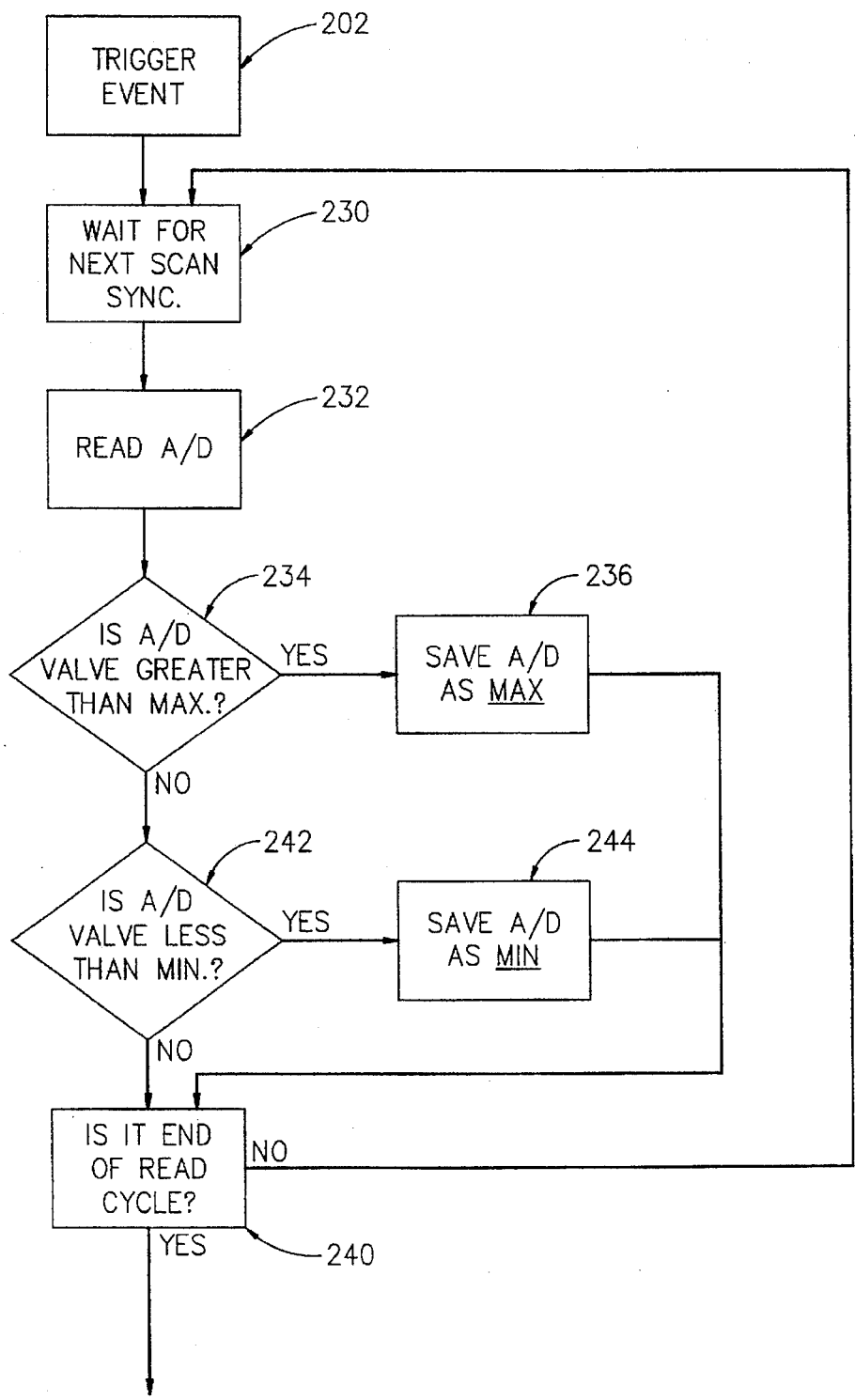
FIG. 8b is a more detailed flow diagram of the software processing of one routine used in the flow chart of FIG. 5 for detecting minimum and maximum reflectance values by the object photo detector for determining presence or absence of the object, in this instance, one of the test tubes.

FIGS. 7a and 7b are diagrams showing the charge current of reflection scan pulses in FIG. 7a that charge the sample and hold capacitor 97 of circuit 95. FIG. 7b is a wave form diagram showing the effect of the fluctuating charge current signal of FIG. 7a as a charge is accumulated on the hold capacitor 97 during a repetitive scan of the object as its dead center scan position. Thus an input charging signal 110 causes a sample hold signal 112 to build up on the capacitor through a series of scan events and resulting object reflection pulses until the held signal 112 approaches a maximum value indicated at 114 which can be evaluated in the programmed microcomputer 48 to verify that indeed an object such as a transparent glass, ceramic or plastic test tube is present in the scanners field of view. FIGS. 8a and 8b set forth the signal processing of microcomputer 48 to detect the presence or absence of an object and output the corresponding information for immediate use or storage as a function of the automated bar code reading and inventory control of the pharmaceutical preparations. In FIG. 8a, a flow chart is shown for the overall bar code scanning, label analysis and object detection. The present invention is concerned with the detection of the object in the environment of a scanner decoding operation. The label reading and decoding operations are known such as described in the above mentioned U.S. Pat. No. 5,239,169 and are not further detailed in this description. Thus in FIG. 8a, the programmed microcomputer 48 commences with a start command 200 in preparation for and awaiting a trigger event 202 that initiates the scanning operation. A scan operation shown generally as block 204 in the flow chart of FIG. 8a, performs a series of operations explained in more detail in connection with the scan flow chart of FIG. 8b below. Following the scan operation of block 204, the microcomputer at 206 determines whether the scanner has successfully decoded a label on the object and if yes, the task is completed and the flow passes to the done block 208. If the scanner has not successfully decoded a label, a no decision from block 206 passes the program flow to another decision block 210 that checks for the scanner sensor status being enabled. If the sensor status is not enabled, a no decision generates an instruction causing scanner to output no read message at block 212 and the program terminates at done block 208. Normally the sensor status will be enabled and a yes decision from block 210 passes the flow to a further decision block 214 that checks for the number of transitions in the label to determine whether they are outside a user defined value. That is if there are too many transitions in the bar code indicating a faulty label read, then the output from block 214 causes an instruction that outputs a bad label message indicated at block 216 and the program terminates at done block 208. If the number of transitions in the read or scanned label are within a user defined value, then the flow proceeds to a further decision block checking for reflectance greater than a user defined threshold in block 218. Again if the system determines that the signal is outside a user defined value, that is a reflectance greater than a defined threshold expected for reflections from a paper label, then the system causes an instruction block 220 to output a no label message when this particular section of the microcomputer program has been enabled during a set up procedure. After completing the output at block 220, the flow proceeds to done block 208. If the reflectance value as determined in decision block 218 is below a user defined threshold level, a no output instructs block 222 to generate a no object message signifying that the system has determined that the reflectance from a scan location at which an object should be present has failed to reach the threshold illustrated by level 64 in FIG. 3b, hence detecting the absence of an object, namely a test tube 12.

In the scan operation of block 204, as illustrated in FIG. 8b, each trigger event causes an instruction block 230 to wait for a new scan sync from scanner 20. One scan sync occurs as known per se at each sweep of the laser diode beam by one facet 30 of mirror 22. Following a wait interval allowing for the next scan sync at block 230, the flow proceeds to instruction block 232 that tells the microcomputer 48 to read the digital input from the A to D convertor of object detection processing circuit 52 as shown in FIG. 5. The read A to D converted data is then checked in a decision block 234 for an A to D value greater than a prior maximum value which has been stored according to instruction block 236 at the yes output of decision block 234. When the scanner first begins to sweep across an object moving into dead center position as shown in FIG. 4a, the maximum value detected by decision block 234 and stored or saved in instruction block 236 is an increasing maximum value and there will be a sequence of yes outputs from block 234 with successive storing of this maximum as the value is building up in the wave form diagram shown in FIG. 7b when an object is present. Thus the output of instruction block 236 returns the flow of the program sequence to an end of read cycle decision block 240 which causes the program flow to continue and loop back to wait for new scan sync at 230 so that the process will be continued for each successive sweep or scan of the object holding position such as on moving test tube rack 14. This process continues until the end of the read cycle as determined by decision block 240. Where the A to D converted value as determined by block 234 is not greater than the previously stored maximum, then the no output from block 234 passes the flow to a less than minimum decision block 242 which performs a similar operation on a previous minimum stored according to instruction block 244 as indicated. As a result of repetitive scans each prompted by a new scan sync from block 230, the maximum and minimum values for each read cycle are stored in memory by instruction blocks 236 and 244. It is these stored minimum and maximum values that are then evaluated by decision block 218. If the stored maximum value resulting from instruction block 236 in FIG. 8b is above the threshold value indicating that an object of the type anticipated, such as a glass or plastic test tube, is present in one of the holding positions of rack 16, then the program of FIG. 8a in the microcomputer instructs decision block 220 to output a no label present message indicating that the object is present but has no label. If the decision block 218 determines that the value is less than the threshold which would be represented by the minimum value stored according to instruction block 244 of FIG. 8b, then the output from block 218 in FIG. 8a causes instruction block 220 to output the no object message indicating no object, or in this case no test tube present in the corresponding holder location of moving rack 14.

While only particular embodiments have been disclosed herein, it will be readily apparent to persons skilled in the art that numerous changes and modifications can be made thereto, including the use of equivalent means, devices, and method steps without departing from the spirit of the invention.

I claim:

1. A bar code scanner for reading bar code labels on objects comprising:

means for producing a beam of coherent light;

means for causing said beam to scan target locations which are adapted to receive objects having bar code labels thereon;

bar code detection means responsive to light reflected from said beam of coherent light scanned across bar code labels on objects present at said target locations;

object presence detector means responsive to specular reflections caused by the scanning of said beam on objects present at said target locations.

2. The bar code scanner of claim 1 wherein said object presence detector means comprises:

photosensor means positioned for detecting specular reflections of coherent light when said beam strikes an object surface normal to the axis of said beam.

3. The bar code scanner of claim 1 wherein said object presence detector means comprises:

photosensor means positioned for detecting specular reflections of coherent light when the scan of said beam strikes an object surface normal to the longitudinal axis of said beam for producing an electrical signal representing said specular reflection;

amplifier means connected to said photosensor means for amplifying said signals representing said specular reflections;

electrical filter means for filtering an output signal produced by said amplifier means; and electrical signal threshold responsive means for producing an output signal when the sensed, amplified and filtered electrical signal has a predetermined level representing the presence of an object.

4. The bar code scanner of claim 1 wherein said object presence detector means comprises:

photosensor means for detecting specular reflections of coherent light as said beam scans said target locations and strikes an object surface normal to the axis of said beam;

optical means forming a window of acceptance of reflected beam light so that only reflections off of a surface of said object lying normal to the axis of said beam are accepted and incident on said photosensor means.

5. The bar code scanner of claim 1 wherein said means for causing said beam to scan said target locations comprises means for causing said beam to repetitively pass across said target locations at a predetermined scanning rate, and wherein said object presence detector means comprises:

photosensor means for detecting specular reflections of coherent light as said beam is repetitively scanned across a surface of an object present at a target location; and electrical filter means for filtering an electrical output signal produced by said photosensor means, said electrical filter means selectively enhancing sensed specular reflections occurring at the rate of said scanning of said beam across said target locations.

6. A bar code scanner apparatus comprising:

means for producing a beam of laser light;

means for causing said beam of laser light to scan coded alternately reflective and non-reflective inked indicia on a reflective surface of an object; and object detection means for detecting the presence of such object in the absence of said indicia by sensing specular reflections from said reflective surface of the object when present and detecting the absence of said object by sensing the absence of said specular reflections when an object is not present.

7. The apparatus of claim 6, wherein an object to be detected has a polished reflective surface capable of producing specular reflections when illuminated by a source of laser light, and wherein said object detection means includes a photo detector disposed so as to detect specular reflections of said beam of laser light from a surface of an object when such surface is disposed normal to said beam of laser light.

8. The apparatus of claim 6, wherein said object detection means comprises optical filter means for selectively passing light frequencies falling within a predetermined band width of said laser light, whereby ambient and other non-coherent light is selectively rejected.

9. The apparatus of claim 6, wherein said object detection means comprises threshold means for detecting specular reflections that are greater than a predetermined threshold.

10. The apparatus of claim 9, wherein the object is a vessel for containing chemical compounds and has a wall surface that is visibly transparent and contoured.

11. The apparatus of claim 10, wherein said vessel is a test tube having a cylindrical body, the exterior surface of which causes said specular reflections when illuminated by said laser light beam.

12. The apparatus of claim 6, wherein said object detection means further comprises optical means for limiting the angle of acceptance of light energy associated with said specular reflections as received from an object.

13. The apparatus of claim 6, wherein the objects are visibly transparent vessels for containing chemical compounds and are transported in side-by-side relationship past a bar code scanner in which said means for producing said laser light beam is mounted, and said specular reflections occur when each of said transported vessels is disposed with an exterior surface normal to said laser light beam.

14. The apparatus of claim 6, comprising signal processor means for processing a signal representing the detection of said specular reflections from an object, including means for determining a maximum reflection intensity and means for determining a minimum reflection intensity, said maximum reflection intensity and said minimum reflection intensity representing the presence or absence of an object, respectively.

15. A method of detecting the presence of an object in a bar code scanning process in which a plurality of objects that may have bar code labels are transported past a bar code scanner, comprising the steps of:

illuminating with coherent light a field of view in which said objects when present are transported;

detecting specular reflections from a surface of each of said objects when present by photodetecting specular reflections and processing an electrical signal resulting therefrom, said step of processing said electrical signal including substeps of sampling and holding said electrical signal for integrating said electrical signal over successive sweeps of said laser beam across a reflective surface of the object; and determining whether an object is present or absent by comparing the level of detected specular reflections with a predetermined threshold.

16. A method of detecting the presence of an object in a bar code scanning process in which a plurality of objects that may have bar code labels are transported past a bar code scanner, comprising the steps of:

illuminating with coherent light a field of view in which said objects when present are transported:

detecting specular reflections from a surface of each of said objects when present;

determining whether an object is present or absent by comparing the level of detected specular reflections with a predetermined threshold, and processing reflections from the field of view of said scanning beam of coherent light so as to determine the presence of an object with label and bar code, the presence of an object with label but without bar code, the presence of an object without label, and the absence of an object.

17. The method of claim 15, further comprising the steps of:

processing said electrical signal representing reflections from the field of view of said scanning beam of coherent light so as to determine the presence of an object with label and with bar code, the presence of a object with label but without bar code, the presence of an object without label, and the absence of an object.

18. A bar code scanner apparatus comprising:

means for producing a beam of laser light;

means for causing said beam of laser light to scan coded indicia on an object; and object detection means for detecting specular reflections from an object when present and detecting the absence of specular reflections when an object is not present, wherein said object detection means comprises a photodetector and a signal processor for processing electrical signals resulting from the detection of said specular reflections by said photodetector, wherein said signal processor comprises sample-and-hold circuit means for integrating a detected signal resulting from reflections due to successive sweeps of said laser beam across a reflective surface of the object.

* * * * *